United States Patent [19]
Daudenarde

[11] Patent Number: 5,995,973
[45] Date of Patent: *Nov. 30, 1999

[54] STORING RELATIONSHIP TABLES IDENTIFYING OBJECT RELATIONSHIPS

[75] Inventor: Jean-Jacques P. Daudenarde, San Jose, Calif.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/921,198

[22] Filed: Aug. 29, 1997

[51] Int. Cl.$^6$ .................................................. G04F 17/30
[52] U.S. Cl. .................. 707/103; 707/1; 707/3; 707/100; 707/102
[58] Field of Search .............................. 707/2, 3, 4, 100, 707/102, 103; 364/282.1, 283.4; 395/680, 683

[56] References Cited

U.S. PATENT DOCUMENTS

| | | | |
|---|---|---|---|
| 5,263,165 | 11/1993 | Janis | 711/163 |
| 5,315,709 | 5/1994 | Alston, Jr. et al. | 707/6 |
| 5,379,419 | 1/1995 | Heffernan et al. | 707/3 |
| 5,526,492 | 6/1996 | Ishida | 395/200.09 |
| 5,561,769 | 10/1996 | Kumar et al. | 395/200.05 |
| 5,583,997 | 12/1996 | Hart | 395/200.15 |
| 5,592,626 | 1/1997 | Papadimitriou et al. | 395/200.09 |
| 5,596,744 | 1/1997 | Dao et al. | 707/10 |
| 5,608,720 | 3/1997 | Biegel et al. | 370/249 |
| 5,687,362 | 11/1997 | Bhargava et al. | 707/2 |
| 5,729,739 | 3/1998 | Cantin et al. | 707/103 |
| 5,765,159 | 6/1998 | Srinivansan | 707/102 |
| 5,797,136 | 8/1998 | Boyer et al. | 707/2 |
| 5,850,544 | 12/1998 | Parvathaney et al. | 707/101 |
| 5,873,093 | 2/1999 | Williamson et al. | 707/103 |
| 5,878,411 | 3/1999 | Burroughs et al. | 707/4 |
| 5,893,913 | 4/1999 | Brodsky et al. | 707/201 |

OTHER PUBLICATIONS

IBM Technical Disclosure Bulletin, vol. 38, No. 01, Jan. 1995, pp. 607–608.

IBM Internet article, http://www.accu-info.com/ibm18-01.htm, "Great New Ads", NewsBooth #18, Oct. 3, 1996 (entire document).

Brower, D. et al., Internet article, http://globecom.net/ietf/rfc/rfc1697.shtml, "RFC1697: Relational Database Management System (RDBMS) Management Information Base (MIB) using SMIv2", pp. 1–36 no date.

National Geophysical Data Center/WDC–A For Solid Earth Geophysics, Internet article, http://julius.ngdc.noaa.gov/seg/prosol.html, "NGDC Hierarchical Data & Metadata Server", Jan. 1997 (entire document).

Internet article, http://skydive.ncsa.ui...present/wm16/fd15.html, "URL/Metadata Database–Georgia Tech" (entire document).

Internet article, http://skydive.ncsa.ui...present/wm16/fd16.html, "Bidirectional Links for the Web" (entire document).

Berkeley Multimedia Research Center, Internet article, http://www.bmrc.berkel...ers/VodsArch94.html#24, "A Distributed Hierarchial Storage Manager for a Video–on–Demand System", Storage and Retrieval for Image and Video Databases II, IS&T/SPIE Symp. on Elec. Imaging Sci. & Tech., San Jose, CA, Feb. 1994, pp. 1–16.

*Primary Examiner*—Paul R. Lintz
*Assistant Examiner*—Ella Colbert
*Attorney, Agent, or Firm*—Pretty, Schroeder & Poplawski, P.C.

[57] ABSTRACT

A method, apparatus, and article of manufacture for maintaining object relationships. A query is executed in a computer to retrieve data from a database stored on a data storage device. Initially, one or more relationship objects are created, wherein each relationship object identifies a source object and a related target object. Next, when accessing a source object, related target objects are determined using the relationship object. When accessing a target object, related source objects are determined using the relationship object.

69 Claims, 5 Drawing Sheets

STORING RELATIONSHIP TABLES IDENTIFYING OBJECT RELATIONSHIPS

CROSS-REFERENCE TO RELATED APPLICATION

This application is related to the following co-pending and commonly-assigned patent application:

Application Ser. No. 08/921,196, entitled "SCALABLE DATA WAREHOUSE ARCHITECTURE," filed on same date herewith, by Linnette M. Bakow, et al., attorney's docket number ST9-97-075, which is incorporated by reference herein.

BACKGROUND OF THE INVENTION

1. Field of the Invention.

This invention relates in general to computer-implemented objects, and in particular, to maintaining object relationships.

2. Description of Related Art.

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on random access storage devices (RASD) such as magnetic or optical disk drives for semi-permanent storage.

RDBMS software using a Structured Query Language (SQL) interface is well known in the art. The SQL interface has evolved into a standard language for RDBMS software and has been adopted as such by both the American National Standards Institute (ANSI) and the International Standards Organization (ISO).

In RDBMS software, all data is externally structured into tables. The SQL interface allows users to formulate relational operations on the tables either interactively, in batch files, or embedded in host languages, such as C and COBOL. SQL allows the user to manipulate the data.

The definitions for SQL provide that a RDBMS should respond to a particular query with a particular set of data given a specified database content, but the method that the DBMS uses to actually find the required information in the tables on the disk drives is left up to the RDBMS. Typically, there will be more than one method that can be used by the RDBMS to access the required data. The RDBMS will optimize the method used to find the data requested in a query in order to minimize the computer time used and, therefore, the cost of doing the query.

Today, a DBMS can instead be an object-oriented database management system (OODBMS). An object-oriented database is organized into objects having members that can be pointers to other objects. One of the key features of an OODMBS is the ability to navigate between objects using these pointers. Additionally, an object can have relationships to other objects. The objects contain references, and collections of references, to other objects in the database, thus leading to databases with complex nested structures.

Typically, when a user queries the OODBMS to search for related objects in the object-oriented database (OODB), the execution of the query results in accessing each object and comparing it to each other object in the OODB to identify relationships. This is time consuming and may deplete costly and limited resources. There is a need in the art for improved searching for related objects.

SUMMARY OF THE INVENTION

To overcome the limitations in the prior art described above, and to overcome other limitations that will become apparent upon reading and understanding the present specification, the present invention discloses a method, apparatus, and article of manufacture for maintaining object relationships.

According to the present invention, a query is executed in a computer to retrieve data from a database stored on a data storage device. Initially, one or more relationship objects are created, wherein each relationship object identifies a source object and a related target object. Next, when accessing a source object, related target objects are determined using the relationship object. When accessing a target object, related source objects are determined using the relationship object.

An object of the present invention is to maintain relationships between objects in an object-oriented database. Another object of the present invention is to provide relationship objects for maintaining relationships between objects. Yet another object of the present invention is to provide relationship objects for searching for related objects.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Hardware Environment

Figure 1:
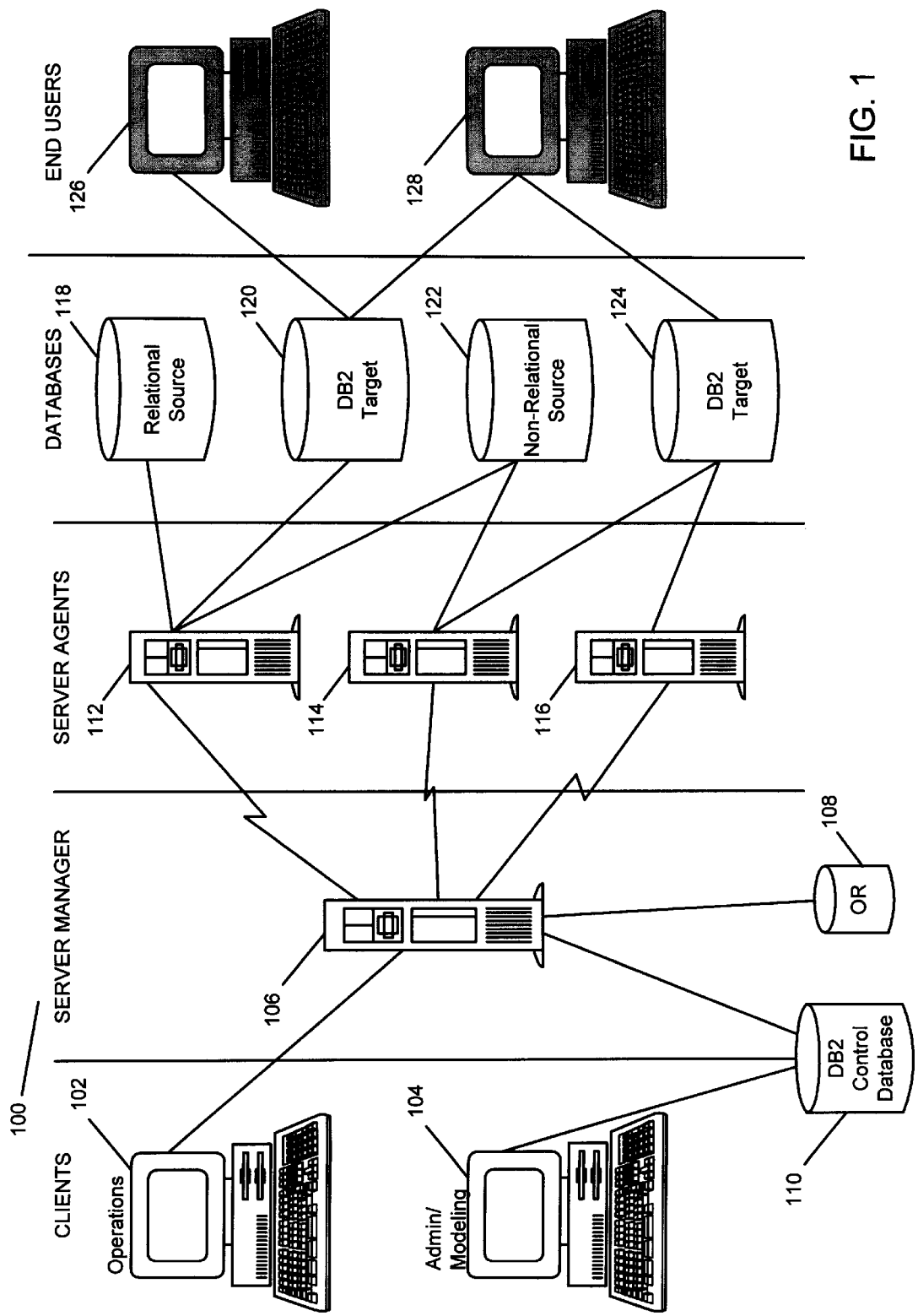
FIG. 1 is a block diagram illustrating an exemplary hardware environment used to implement the preferred embodiment of the present invention.

FIG. 1 is a block diagram illustrating an exemplary hardware environment used to implement the preferred embodiment of the present invention. In the exemplary hardware environment, a scalable data warehouse architecture 100 is illustrated. The scalable data warehouse architecture 100 has a two-tier server architecture.

Data warehouse client computers 102 and 104 having, inter alia, monitors and data storage devices are connected to a DB2 control database 110. The client computers 102 and 104 communicate with the first tier of server computers 106 to request processing of a query. Execution of the query transfers data from a source database 118 and 122 to a target database 120 and 124. End user computers 126 and 128 are connected to the target databases 120 and 124, which enables users to perform data analysis at the end user computers 126 and 128.

The first tier of server computers comprises a server computer 106 connected to a DB2 control database 110. This server computer 106 is a manager server computer for interfacing with client computers 102 and 104 and exercising control over the second tier of server computers 112, 114, and 116. The manager server computer 106 receives a query from a client computer 102 or 104. The manager server computer 106 schedules the processing of the query and stores the query in the DB2 control database 110 for later forwarding to an agent server computer 112, 114, or 116 for execution of the query. Object Relationship ("OR") software 108, for maintaining relationships between objects, is stored on a data storage device connected to the manager server computer 106. One skilled in the art would recognize that the OR software 108 could instead be stored at another location, for example at each agent server computer 112, 114, and 116.

The second tier of server computers 112, 114, and 116 are agent server computers for transferring data between data sources 118 and 122 and data targets 120 and 124. The manager server computer 106 preferably communicates with the agent server computers 112, 114, and 116 via Transmission Control Protocol/internet Protocol (TCP/IP). The agent server computers 112, 114, and 116 preferably communicate with databases 118, 120, 122, and 124 via Open Database Connectivity (ODBC). Once an agent server computer 112, 114, or 116 has executed a query, the agent server computer 112, 114, or 116 reports the results to the manager server computer 106. The manager server computer 106 stores the results in the control database 110. The client computers 102 and 104 can access the results in the control database 110.

In the exemplary hardware environment, the client computers 102 and 104 and the server computers 106, 112, 114, and 116 may each include, inter alia, a processor, memory, keyboard, or display, and may be connected locally or remotely to fixed and/or removable data storage devices and/or data communications devices. Each of the computers 102, 104, 106, 112, 114, and 116 could also be connected to other computer systems via the data communications devices. Those skilled in the art will recognize that any combination of the above components, or any number of different components, peripherals, and other devices, may be used with the computers 102, 104, 106, 112, 114, and 116. Those skilled in the art will also recognize that the present invention may be implemented on a single computer, rather than multiple computers networked together.

The present invention is typically implemented using one or more computer programs, each of which executes under the control of an operating system, such MVS™, AIX™, OS/2™, WINDOWS NT™, WINDOWS™, UNIX™, etc., and causes the computers 102, 104, 106, 112, 114, and 116 to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system are all tangibly embodied in a computer-readable device or media, such as memory, data storage devices, and/or data communications devices, thereby making a computer program product or article of manufacture according to the invention. As such, the terms "article of manufacture" and "computer program product" as used herein are intended to encompass a computer program accessible from any computer readable device or media.

Moreover, the computer programs and operating system(s) are comprised of instructions which, when read and executed by the computers 102, 104, 106, 112, 114, and 116, cause the computers 102, 104, 106, 112, 114, and 116 to perform the steps necessary to implement and/or use the present invention. Under control of the operating system, the computer programs may be loaded from the memory, data storage devices, and/or data communications devices into the memories of the computers 102, 104, 106, 112, 114, and 116 for use during actual operations. Those skilled in the art will recognize many modifications may be made to this configuration without departing from the scope of the present invention.

Overview

The object relationship ("OR") software 108 of the present invention provides an efficient tool for maintaining relationships between objects in a relational database. The OR software 108 implements an object-oriented view on top of a RDBMS. Through the use of relationship objects, the OR software 108 is able to decrease the amount of time and resources used to identify related objects. In particular, the OR software 108 maintains links between persistent objects and between their transient versions with the minimum amount of database access.

Different objects may belong to different classes. The objects are stored persistently in a relational database, in which one table is assigned to each class. Each class table contains columns that represent the data members of the objects for that class. Each object has an object identifier (ID). All objects of the same class have different object identifiers. However, the object identifiers for each object in the relational database has the same data type, for example, all object identifiers may be comprised of integers. Additionally, objects may exist in transient form in memory when they are manipulated by computer programs.

All objects in memory are derived from a single class (i.e., a base class), which preferably contains the following:

Object identifier of the object.

Virtual methods to retrieve an object by its object identifier (RetrieveID).

A list of relationship objects.

For example, the three classes, Users, Groups, and Departments represent security objects. These classes are represented persistently in the following tables:

| USERS TABLE | |
|---|---|
| ID | UNAME |
| 12 | UserA |
| 23 | UserB |
| 34 | UserC |

| GROUPS TABLE | | |
|---|---|---|
| ID | GNAME | PRIVILEGES |
| 101 | Normal Users | Read |
| 202 | Authors | Write |

| DEPARTMENTS TABLE | |
|---|---|
| ID | DNAME |
| 700 | Department 700 |
| 701 | Department 701 |

Each user object in the Users class has an object identifier, ID, and a user name, UNAME. Each group object in the Groups class has an object identifier, ID, a group name, GNAME, and a privileges flag, PRIVILEGES. Each department object in the Departments class has a department identifier, ID, and a department name, DNAME.

The relationship between persistent objects is represented by a relationship table. Each row of the relationship table preferably contains:

An object identifier of a first object.
An object identifier of a second object.
An indication of the relationship between the first and second objects.

In particular, the relationship column indicates a relationship between the first object in the first column and the second object in the second column. For example, a user object can belong to one or more group objects. In addition, a user object can manage a group object.

The following table is an example of a relationship table:

| RELATIONSHIP TABLE | | |
|---|---|---|
| ID1 | ID2 | RNAME |
| 12 | 101 | Belongs |
| 23 | 101 | Belongs |
| 34 | 202 | Belongs |
| 34 | 101 | Belongs |
| 202 | 12 | Managed By |
| 101 | 12 | Managed By |
| 12 | 700 | Works In |
| 23 | 700 | Works In |
| 34 | 701 | Works In |

The columns ID1 and ID2 identify the first and second objects. The column RNAME provides the relationship name. In one embodiment of the present invention, a system has only one relationship table defining the relationships of the objects in a relational database. However, one skilled in the art would recognize that multiple relationship tables could be used to maintain the relationships of the objects.

The object identifiers for the first object, ID1, and the second object, ID2, can be from any object class. However, for a given relationship, the object identifiers for the first and second objects must identify objects of the same class, in the same order. For example, for each entry indicating that a user object (first object identifier) "Belongs" (relationship name) to a group object (second object identifier), the user object identifier should be the first object identifier and the group object identifier should be the second object identifier. For the relationship "Managed By", the first object identifier indicates a group object identifier and the second object identifier indicates a user object identifier for the who manages that group. For the relationship "Works In", the first object identifier indicates a user object identifier and the second object identifier indicates the department object identifier for the department in which the user works.

An OODMBS navigates between objects using pointers. The OR software 108 implements these pointers on top of a RDBMS. By having a relationship table, the OR software 108 can follow relationships between objects without having to access the objects themselves.

For example, to determine the department name of the users who manage the group authors, the following example query can be used:

SELECT Department.DNAME From Department, Relationship R1, Relationship R2, Group
   WHERE R1.RNAME = "Works In" and R1.ID2 = Department.ID and
     R1.ID1 = R2.ID2 and R2.RNAME = "Managed By" and
     R2.ID1 = Group.ID and Group.GNAME = "Authors"

When the Group table resides in memory and its identifier is available, the query is simplified by not selecting from the Group table, as illustrated in the following example query:

SELECT Department.DNAME From Department, Relationship R1, Relationship R2
   WHERE R1.RNAME = "Works In" and R1.ID2 = Department.ID and
     R1.ID1 = R2.ID2 and R2.RNAME = "Managed By" and
     R2.ID1 = :AlreadyInMemoryGroupId The use of a single Relationship table with narrow rows (i.e., each row has two object identifiers and a relationship name, which can all be represented as integers) allows the RDBMS to optimize its access and caching of the relationship data. The maintenance of the Departments, Groups, and Users tables is simplified as it requires only one unique index on an identifier column. The Relationship table is indexed independently of the relationships the table represents. On the other hand, without a Relationship table, the Users table would have to hold information about the groups and departments to which each user belongs. Additionally, the Users table would have to be independently optimized for navigation between objects.

Moreover, when a Relationship table is available, generating a new object does not require a change in the existing objects to indicate the relationship between the new object and the old objects. For example, when a departments object is added, the Relationship table can be updated to reflect that a users object is related to the departments object. On the other hand, if a Relationship table were not available, the Users table would have to be modified and a Department Identifier column would have to be added to the Users table, with proper indexing.

Relationship Objects

Figure 2:
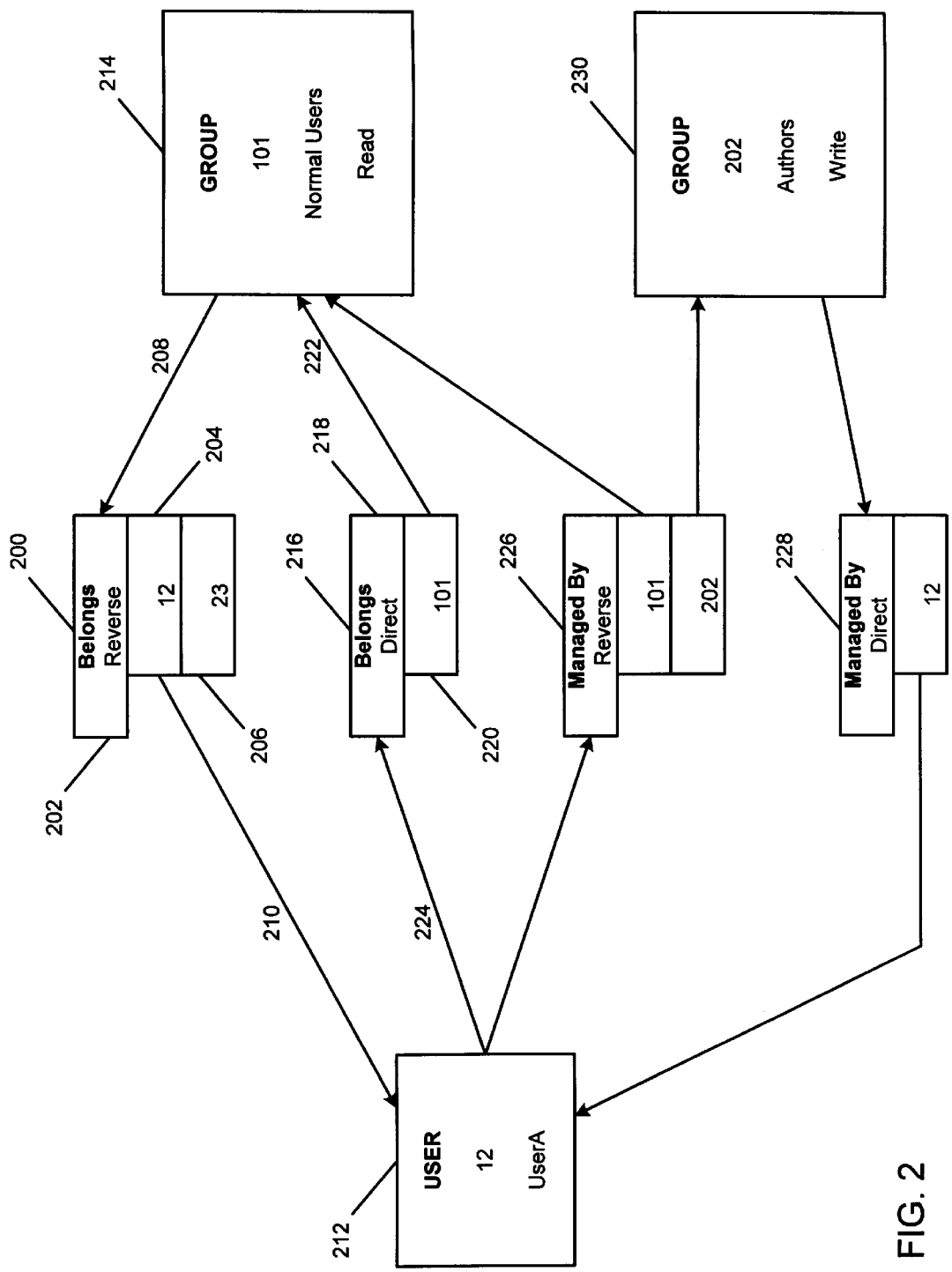
FIG. 2 is a block diagram illustrating relationship objects that identify the relationships between objects.

FIG. 2 is a diagram illustrating relationship objects that identify the relationships between objects. In particular, FIG. 2 illustrates the relationship objects for the relationships "Belongs" and "Managed By" in the Relationship table above. In storage, object data members are represented exactly as they are in their persistent table. In conventional computer systems, the relationships between objects are often represented by pointers. However, the OR software 108 represents relationships with a relationship object, which is an intermediate transient object that provides a more efficient manner of searching for related objects. A relationship object is created to represent relationships between object copies that are in memory.

A relationship object has a header and an array of relationship elements ("RelElements"). The header of a relationship object preferably contains:

A relationship indicator.
A direction flag.
A pointer.

The relationship indicator indicates the particular relationship between the source object and the target object. The direction flag indicates whether the relationship is "Direct" or "Reverse". For a particular relationship, such as "Belongs", when a relationship is "Direct", the header contains a pointer from the source object, which is identified in the first column of the relationship table, to the relationship object. For the same relationship (i.e., "Belongs"), when a relationship is "Reverse", the header contains a pointer from the target object, which is the object identified in the second column of the relationship table, to the relationship object. An object can be a source object in one relationship and a target object in another relationship.

Each relationship object has one or more RelElements that correspond to related objects. A RelElement corresponds to an in-memory copy of a target object when the direction flag in the header is set to "Direct" and corresponds to an in-memory copy of a source object when the direction flag is set to "Reverse". Each RelElement preferably contains:

The object identifier of the target object.

A pointer.

An owner flag.

For a relationship object, there are as many RelElements as there are related objects for that particular relationship. For example, relationship object 200 has two RelElements 204 and 206 because both of these represent objects having the relationship "Belongs" with a direction of "Reverse" with the target object 214.

The object identifier is obtained from the relationship table. A single record in the Relationship table corresponds to two Relationship objects in memory. One relationship object has its direction flag set to "Direct", while the other relationship object has its direction flag set to "Reverse". When the direction flag is set to "Direct" in the header, the RelElements in the relationship object correspond to the objects identified in the second column in the relationship table, and the pointer for each RelElement indicates the copy in memory of that object when the copy in memory is available. When the direction flag is set to "Reverse" in the header, the RelElements in the relationship object correspond to the objects identified in the first column of the relationship table, and the pointer indicates the copy in memory of that object when it is available. The owner flag indicates whether or not the RelElement "owns" the corresponding object (i.e., has allocated memory for the object).

For example, in FIG. 2, for relationship object 200, which has a "Reverse" relationship, RelElement 204 has an object identifier of 12 and a pointer 210 to the related object 212. Additionally, the OR software 108 sets an owner flag to FALSE indicating that the RelElement does not own the related object 212. When the related object is "not owned" (i.e., the owner flag is set to FALSE), deleting the object does not delete the related object. Therefore, when the group object 214 is deleted, the user object 212 is not deleted. Relationship object 216, which has a "Direct" relationship, has RelElement 220 and a pointer 222 to the related object 214. The OR software 108 sets an owner flag to TRUE indicating that the RelElement does own the related object 214. When the corresponding object is "owned" (i.e., the owner flag is set to TRUE), deleting the RelElement does not delete the related object. When the source object 212 is deleted, the target object 214 is deleted.

The following discussion will describe a series of steps that generate the objects in FIG. 2, starting with the user object 212. Initially, the user object 212 is created in memory. The user object 212 contains a user identifier of 12 and a user name of UserA. Once the user object 212 is created, relationship objects 216 and 226 are created to represent the relationships for user object 212. Although relationship objects for the relationship "Works In" are not illustrated in FIG. 2, one skilled in the art would recognize that these would also be created.

Relationship object 216 is created with a header 218. The header 218 indicates that the relationship is "Belongs" with a direction flag set to "Direct", and the pointer 224 is directed from the source object 212 to the relationship object 216. The direction flag is set to "Direct" because the user object 212 is in the first column of the Relationship table for the relationship "Belongs". Although the relationship object 216 was created with the direction flag set to "Direct", one skilled in the art would recognize that the two mirror relationships (i.e., "Direct" and "Reverse") are always in opposite direction, but either one can be created first.

When a relationship object is initially created, it does not have RelElements. Next, relationship object 226 is created, without RelElements, and the direction flag is set to "Reverse" because the user object 212 is in the second column of the Relationship table for the relationship "Managed By".

The OR software 108 provides two methods, GetFirst and GetNext, to access the target objects. In particular, the GetFirst method accesses the first target object, and the GetNext object accesses each other target object. A program invokes the GetFirst method on relationship object 216 to access a first target object 214. Each method returns the address of a copy in memory of the target object. Using these methods, the OR software obtains the addresses of target objects and sets pointers accordingly.

When the GetFirst method is invoked for relationship object 216, the OR software 108 accesses the relationship table to find the list of identifiers in the second column of the relationship table that correspond to the identifier of the user object 212 that is in the first column of the relationship table and that corresponds to the relationship "Belongs". A RelElement is added to the relationship object 216 for each identifier found with a NULL pointer to a target object. This allows the OR software 108 to create all of the RelElements with a single access to the Relationship table in the RDBMS. In this example, RelElement 220 is added to relationship object 216.

Next, the OR software 108 resolves each RelElement pointer by invoking the RetrieveID method to materialize the target object and set a pointer to it in the appropriate RelElement. For example, the pointer 222 is resolved for RelElement 220. When the pointer 222 is resolved, the group object 214 is created as well as the mirror relationship 200. The group object 214 contains a group identifier of 101, a group name of Normal Users, and privileges that enable members to perform read operations. When the relationship element 200 is created, the OR software 108 creates RelElements 204 and 206. Then, the OR software 108 resolves pointer 210 for RelElement 204. However, the pointer for RelElement 206 remains unresolved because there is no inmemory instance of user object 206.

The OR software 108 sets the owner flag of RelElement 220 to TRUE in the relationship object 216 because the group object 214 was created by a GetFirst method after user object 212 was created. That is, group object 214 did not exist prior to the creation of user object 212. Therefore, when user object 212 is deleted, group object 214 is also deleted. The OR software 108 sets the owner flag of RelElement 204 to FALSE in relationship object 200 because the user object 212 existed at the time the group object 214 was created. Therefore, when group object 214 is deleted, user object 212 is not deleted.

Similarly, the OR software 108 creates the other objects in FIG. 2, including the group object 230, which contains a group identifier of 202, a group name of Authors, and privileges that enable members to perform write operations.

Figure 3:
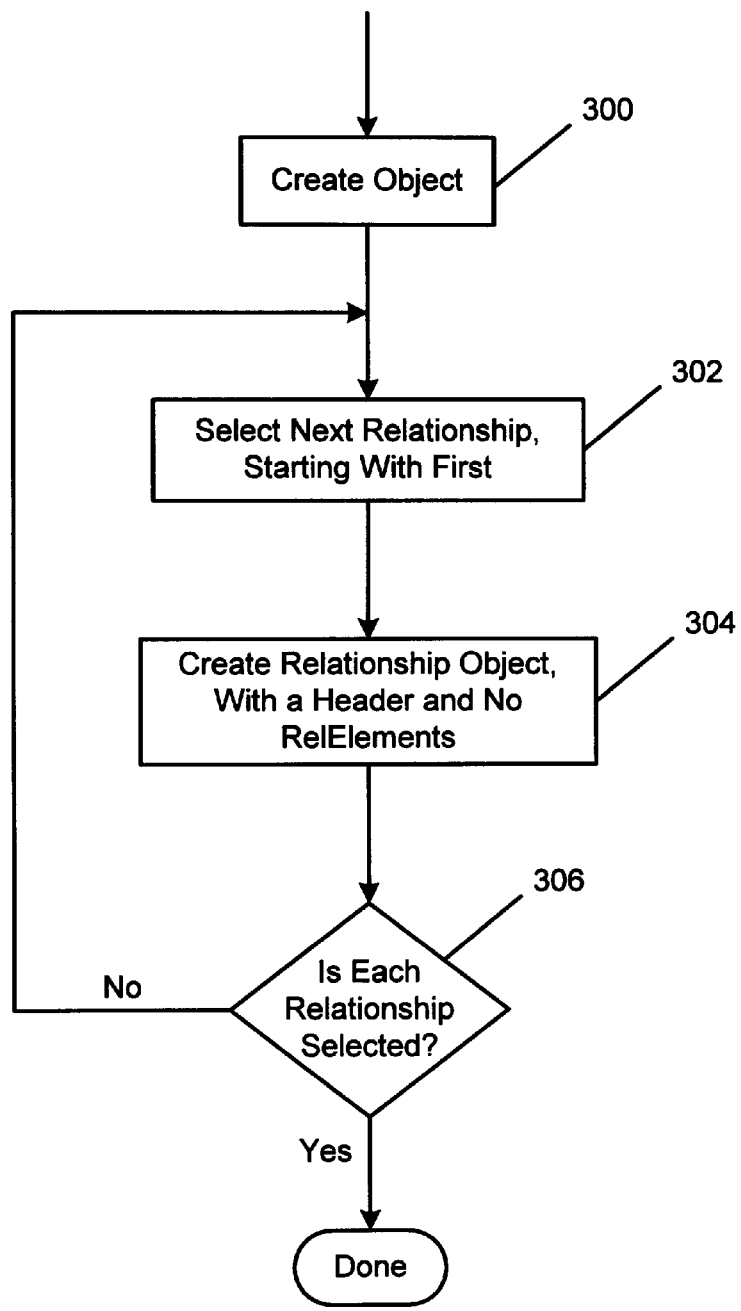
FIG. 3 is a flow diagram illustrating the steps performed by the OR software to create relationship objects.

FIG. 3 is a flow diagram illustrating the steps performed by the OR software 108 to create relationship objects when a database object is created. In Block 300, an object is created. When the object is created, relationship objects are created for each relationship of the object. Initially, when the object is created, only a header is built for each relationship object associated with the object. For example, when the user object 212, illustrated in FIG. 2, is created, relationship objects 216 and 226 are also created.

In Block 302, the OR software 108 selects a next relationship that the object has with another object, starting with the first. The OR software 108 determines the relationships using the relationship table. In Block 304, the OR software 108 creates a relationship object for the relationship selected in Block 302. In particular, for the selected relationship, the OR software 108 creates a relationship object with a header and no RelElements. In Block 306, the OR software 108 determines whether all relationships have been selected. If not all relationships for the source object have been selected, the OR software 108 loops back to Block 302 to process the next relationship. Otherwise the loop terminates.

Figure 4:
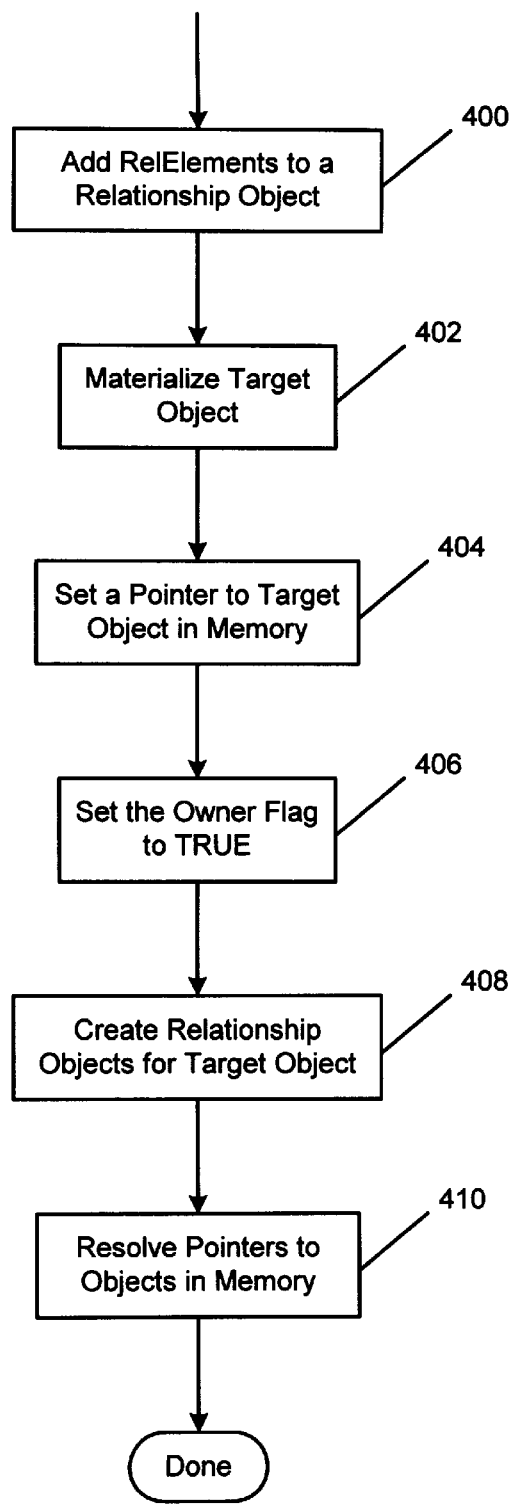
FIG. 4 is a flow diagram illustrating the steps performed by the OR software to resolve pointers for objects.

FIG. 4 is a flow diagram illustrating the steps performed by the OR software 108 to resolve pointers for objects. When a relationship object is referenced via the GetFirst or GetNext method, the OR software 108 resolves pointers for RelElements in the relationship object.

In Block 400, the OR software 108 adds RelElements to a relationship object that is referenced. Next, the OR software invokes the RetrieveID method to materialize the target object and set a pointer to it in the appropriate RelElement of a relationship object. In particular, in Block 402, the OR software 108 materializes the target object. In Block 404, the OR software 108 sets a pointer from the RelElement to the target object in memory based on the address provided by the GetFirst or GetNext method. In Block 406, the OR software sets the owner flag for the RelElement to TRUE. When the owner flag is set to TRUE, deleting the source object deletes the target object.

Additionally, when the target object is created, relationship objects are created for the relationships for that target object. In Block 408, the OR software 108 creates relationship objects for relationships for the target object. The relationship objects are created with RelElements. In Block 410, the OR software 108 resolves pointers to objects in memory corresponding to RelElements in the created relationship objects.

When objects are deleted, the pointers to the deleted objects and to their related objects must be updated accordingly. Each object has a list of relationships identifying objects to which it is related. When an object is deleted, the OR software 108 uses the list of relationships to identify relationship objects for the deleted object.

Figure 5:
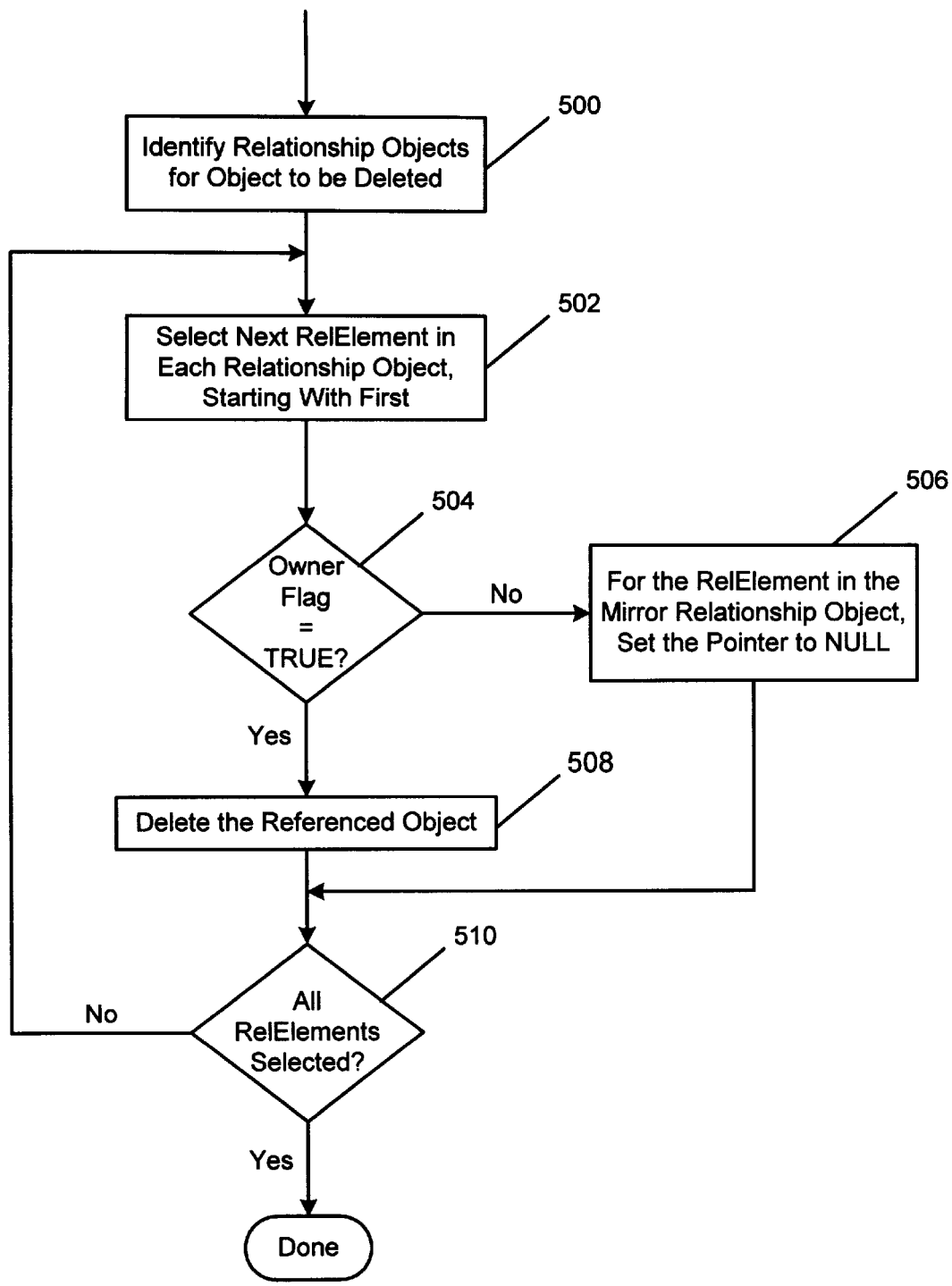
FIG. 5 is a flow diagram illustrating the steps performed by the OR software when an object is deleted.

FIG. 5 is a flow diagram illustrating the steps performed by the OR software 108 when an object is deleted. In Block 500, the OR software 108 identifies the relationship objects for the source object to be deleted. The OR software 108 identifies these relationship objects by scanning the list of relationships at the source object and using the relationships to identify the appropriate relationship objects. In Block 502, the OR software 108 selects the next RelElement in each relationship object starting with the first. When the relationship object has a direction of "Direct", each of the RelElements in the relationship object is selected. When the relationship object has a direction of "Reverse", only the RelElement corresponding to the object to be deleted is selected.

In Block 504, the OR software 108 determines whether the owner flag for the selected RelElement is set to TRUE. When the relationship object has a direction of "Direct", the pointer at the header is from the object to be deleted, the RelElements in the relationship object identify the related object, and the owner flag is set to TRUE. In this case, the related object is deleted. When the relationship object has a direction of "Reverse", the pointer at the header is from the related object, the RelElements in the relationship object identify the object to be deleted, and the owner flag is set to FALSE. In this case, the pointer in the RelElement for the related object, which points to the object to be deleted, is set to NULL. In Block 508, if the owner flag has been set to TRUE, the OR software 108 deletes the target object. In Block 506, if the owner flag has been set to FALSE, the OR software 108 identifies the RelElement corresponding to the object to be deleted in the mirror relationship object and sets the pointer from the RelElement to the object to be deleted to NULL. In Block 510, the OR software 108 determines whether all RelElements have been selected. When all RelElements have not been selected, the OR software loops back to Block 502 to process the next RelElement. Otherwise, the loop terminates.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for maintaining object relationships. The present invention maintains relationships between objects in an object-oriented database. The present invention provides relationship objects for maintaining relationships between objects. The present invention also provides relationship objects for searching for related objects.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing a query in a computer to retrieve data from a data base stored on a data storage device, comprising the steps of:

storing one or more relationship tables that identify relationships between source and target objects, wherein a relationship specifies one of a plurality of possible classifications between the source and target objects;

creating one or more relationship objects using the relationship tables, wherein each relationship object has multiple relationship elements, and wherein each relationship element identifies a source object and a related target object, and wherein each relationship object identifies a relationship specifying one of a plurality of possible classifications between the source and target objects;

when accessing a source object, determining related target objects using the relationship object having a selected relationship; and when accessing a target object, determining related source objects using the relationship object having a selected relationship.

2. The method of claim 1 above, wherein the relationship object is comprised of a header having an indicator linking the relationship object to the source object.

3. The method of claim 2 above, wherein the header has a direction flag indicating that the relationship object represents a direct relationship.

4. The method of claim 3 above, wherein the relationship elements correspond to target objects.

5. The method of claim 2 above, wherein the header has a direction flag indicating that the relationship object represents a reverse relationship.

6. The method of claim 5 above, wherein the relationship elements correspond to source objects.

7. The method of claim 1 above, further comprising the step of deleting a source object.

8. The method of claim 7 above, wherein the relationship object has an owner flag indicating that the source object owns the target object and wherein the step of deleting further comprises the step of deleting the target object.

9. The method of claim 7 above, wherein the relationship object has an owner flag indicating that the source object does not own the target object and wherein the step of deleting further comprises the step of setting an indicator to the source object to indicate that the source object has been deleted.

10. The method of claim 1 above, wherein the target object is transient.

11. The method of claim 1 above, wherein the target object is persistently stored.

12. The method of claim 1 above, wherein the source object is transient.

13. The method of claim 1 above, wherein the source object is persistently stored.

14. A method of executing a query in a computer to retrieve data from a database stored on a data storage device, comprising the steps of:

storing one or more relationship tables that identify relationships between source and target objects, wherein a relationship specifies one of a plurality of possible classifications between the source and target objects;

creating one or more relationship objects using the relationship tables, wherein each relationship object has multiple relationship elements, and wherein each relationship element identifies a source object and a related target object, and wherein each relationship object identifies a relationship specifying one of a plurality of possible classifications between the source and target objects; and when accessing a source object, determining related target objects using the relationship object having a selected relationship.

15. The method of claim 14 above, wherein the target object is transient.

16. The method of claim 14 above, wherein the target object is persistently stored.

17. The method of claim 14 above, wherein the source object is transient.

18. The method of claim 14 above, wherein the source object is persistently stored.

19. A method of executing a query in a computer to retrieve data from a database stored on a data storage device, comprising the steps of:

storing one or more relationship tables that identify relationships between source and target objects, wherein a relationship specifies one of a plurality of possible classifications between the source and target objects;

creating one or more relationship objects using the relationship tables, wherein each relationship object has multiple relationship elements, and wherein each relationship element identifies a source object and a related target object, and wherein each relationship object identifies a relationship specifying one of a plurality of possible classifications between the source and target objects; and when accessing a target object, determining related source objects using the relationship object having a selected relationship.

20. The method of claim 19 above, wherein the target object is transient.

21. The method of claim 19 above, wherein the target object is persistently stored.

22. The method of claim 19 above, wherein the source object is transient.

23. The method of claim 19 above, wherein the source object is persistently stored.

24. An apparatus for executing a query to retrieve data from a database, comprising:

a computer having a memory and a data storage device coupled thereto, wherein the data storage device stores the database;

one or more computer programs, performed by the computer, for storing one or more relationship tables that identify relationships between source and target objects, wherein a relationship specifies one of a plurality of possible classifications between the source and target objects, creating one or more relationship objects using the relationship tables, wherein each relationship object has multiple relationship elements, and wherein each relationship element identifies a source object and a related target object, and wherein each relationship object identifies a relationship specifying one of a plurality of possible classifications between the source and target objects, when accessing a source object, determining related target objects using the relationship object having a selected relationship, and, when accessing a target object, determining related source objects using the relationship object having a selected relationship.

25. The apparatus of claim 24 above, wherein the relationship object is comprised of a header having an indicator linking the relationship object to the source object.

26. The apparatus of claim 25 above, wherein the header has a direction flag indicating that the relationship object represents a direct relationship.

27. The apparatus of claim 26 above, wherein the relationship elements correspond to target objects.

28. The apparatus of claim 25 above, wherein the header has a direction flag indicating that the relationship object represents a reverse relationship.

29. The apparatus of claim 28 above, wherein the relationship elements correspond to source objects.

30. The apparatus of claim 24 above, further comprising the means for deleting a source object.

31. The apparatus of claim 30 above, wherein the relationship object has an owner flag indicating that the source object owns the target object and wherein the means for deleting further comprise the means for deleting the target object.

32. The apparatus of claim 30 above, wherein the relationship object has an owner flag indicating that the source object does not own the target object and wherein the means for deleting further comprises the means for setting an indicator to the source object to indicate that the source object has been deleted.

33. The apparatus of claim 24 above, wherein the target object is transient.

34. The apparatus of claim 24 above, wherein the target object is persistently stored.

35. The apparatus of claim 24 above, wherein the source object is transient.

36. The apparatus of claim 24 above, wherein the source object is persistently stored.

37. An apparatus for executing a query to retrieve data from a database, comprising:
   a computer having a memory and a data storage device coupled thereto, wherein the data storage device stores the database;
   one or more computer programs performed by the computer, for storing one or more relationship tables that identify relationships between source and target objects, wherein a relationship specifies one of a plurality of possible classifications between the source and target objects, creating one or more relationship objects using the relationship tables, wherein each relationship object has multiple relationship elements, and wherein each relationship element identifies a source object and a related target object, and wherein each relationship object identifies a relationship specifying one of a plurality of possible classifications between the source and target objects, and, when accessing a source object, determining related target objects using the relationship object having a selected relationship.

38. The apparatus of claim 37 above, wherein the target object is transient.

39. The apparatus of claim 37 above, wherein the target object is persistently stored.

40. The apparatus of claim 37 above, wherein the source object is transient.

41. The apparatus of claim 37 above, wherein the source object is persistently stored.

42. An apparatus for executing a query to retrieve data from a database, comprising:
   a computer having a memory and a data storage device coupled thereto, wherein the data storage device stores the database;
   one or more computer programs, performed by the computer, for storing one or more relationship tables that identify relationships between source and target objects, wherein a relationship specifies one of a plurality of possible classifications between the source and target objects, creating one or more relationship objects using the relationship tables, wherein each relationship object has multiple relationship elements, and wherein each relationship element identifies a source object and a related target object, and wherein each relationship object identifies a relationship specifying one of a plurality of possible classifications between the source and target objects, and when accessing a target object, determining related source objects using the relationship object having a selected relationship.

43. The apparatus of claim 42 above, wherein the target object is transient.

44. The apparatus of claim 42 above, wherein the target object is persistently stored.

45. The apparatus of claim 42 above, wherein the source object is transient.

46. The apparatus of claim 42 above, wherein the source object is persistently stored.

47. An article of manufacture comprising a program storage medium readable a computer and embodying one or more instructions executable by the computer to perform method steps for executing a query to retrieve data from a database stored on a data storage device, the method comprising the steps of:
   storing one or more relationship tables that identify relationships between source and target objects, wherein a relationship specifies one of a plurality of possible classifications between the source and target objects;
   creating one or more relationship objects using the relationship tables, wherein each relationship object has multiple relationship elements, and wherein each relationship element identifies a source object and a related target object, and wherein each relationship object identifies a relationship specifying one of a plurality of possible classifications between the source and target objects,
   when accessing a source object, determining related target objects using the relationship object having a selected relationship; and
   when accessing a target object, determining related source objects using the relationship object having a selected relationship.

48. The article of manufacture of claim 47 above, wherein the relationship object is comprised of a header having an indicator linking the relationship object to the source object.

49. The article of manufacture of claim 48 above, wherein the header has a direction flag indicating that the relationship object represents a direct relationship.

50. The article of manufacture of claim 49 above, wherein the relationship elements correspond to target objects.

51. The article of manufacture of claim 48 above, wherein the header has a direction flag indicating that the relationship object represents a reverse relationship.

52. The article of manufacture of claim 51 above, wherein the relationship elements correspond to source objects.

53. The article of manufacture of claim 47 above, further comprising the step of deleting a source object.

54. The article of manufacture of claim 53 above, wherein the relationship object has an owner flag indicating that the source object owns the target object and wherein the step of deleting further comprises the step of deleting the target object.

55. The article of manufacture of claim 53 above, wherein the relationship object has an owner flag indicating that the source object does not own the target object and wherein the step of deleting further comprises the step of setting an indicator to the source object to indicate that the source object has been deleted.

56. The article of manufacture of claim 47 above, wherein the target object is transient.

57. The article of manufacture of claim 47 above, wherein the target object is persistently stored.

58. The article of manufacture of claim 47 above, wherein the source object is transient.

59. The article of manufacture of claim 47 above, wherein the source object is persistently stored.

60. An article of manufacture comprising a program storage medium readable by a computer and embodying one or more instructions executable by the computer to perform method steps for executing a query to retrieve data from a database stored on a data storage device, the method comprising the steps of:
   storing one or more relationship tables that identify relationships between source and target objects, wherein a relationship specifies one of a plurality of possible classifications between the source and target objects;

creating one or more relationship objects using the relationship tables, wherein each relationship object has multiple relationship elements, and wherein each relationship element identifies a source object and a related target object, and wherein each relationship object identifies a relationship specifying one of a plurality of possible classifications between the source and target objects; and when accessing a source object, determining related target objects using the relationship object having a selected relationship.

61. The article of manufacture of claim 60 above, wherein the target object is transient.

62. The article of manufacture of claim 60 above, wherein the target object is persistently stored.

63. The article of manufacture of claim 60 above, wherein the source object is transient.

64. The article of manufacture of claim 60 above, wherein the source object is persistently stored.

65. An article of manufacture comprising a program storage medium readable by a computer and embodying one or more instructions executable by the computer to perform method steps for executing a query to retrieve data from a database stored on a data storage device, the method comprising the steps of:

storing one or more relationship tables that identify relationships between source and target objects, wherein a relationship specifies one of a plurality of possible classifications between the source and target objects;

creating one or more relationship objects using the relationship tables, wherein each relationship object has multiple relationship elements, and wherein each relationship element identifies a source object and a related target object, and wherein each relationship object identifies a relationship specifying one of a plurality of possible classifications between the source and target objects; and when accessing a target object, determining related source objects using the relationship object having a selected relationship.

66. The article of manufacture of claim 65 above, wherein the target object is transient.

67. The article of manufacture of claim 65 above, wherein the target object is persistently stored.

68. The article of manufacture of claim 65 above, wherein the source object is transient.

69. The article of manufacture of claim 65 above, wherein the source object is persistently stored.

* * * * *